(12) United States Patent
Buckner et al.

(10) Patent No.: US 11,300,229 B2
(45) Date of Patent: Apr. 12, 2022

(54) PACKING MODULE AND STUFFING BOX ASSEMBLY

(71) Applicant: Performance Oil Tools, Inc., Cody, WY (US)

(72) Inventors: Thomas Buckner, Cody, WY (US); Jeffrey Leisy, Cody, WY (US)

(73) Assignee: PERFORMANCE OIL TOOLS, INC., Cody, WY (US)

( * ) Notice: Subject to any disclaimer, the term of this patent is extended or adjusted under 35 U.S.C. 154(b) by 118 days.

(21) Appl. No.: 16/844,576

(22) Filed: Apr. 9, 2020

(65) Prior Publication Data

US 2021/0010614 A1 Jan. 14, 2021

Related U.S. Application Data

(60) Provisional application No. 62/872,812, filed on Jul. 11, 2019.

(51) Int. Cl.
| | |
|---|---|
| *F16K 41/02* | (2006.01) |
| *F16K 41/04* | (2006.01) |
| *F16K 5/06* | (2006.01) |
| *F16J 15/00* | (2006.01) |
| *F16K 1/14* | (2006.01) |

(52) U.S. Cl.
CPC ............. *F16K 41/04* (2013.01); *F16J 15/002* (2013.01); *F16K 1/14* (2013.01); *F16K 5/0663* (2013.01); *F16K 41/023* (2013.01); *F16K 41/026* (2013.01); *F16K 41/043* (2013.01); *F16K 41/046* (2013.01)

(58) Field of Classification Search
CPC ...... F16K 41/04; F16K 5/0663; F16K 41/026; F16K 41/043; F16K 41/046; F16K 41/023; F16K 41/02; F16K 1/14; F16J 15/002
USPC ........................................................ 251/214
See application file for complete search history.

(56) References Cited

U.S. PATENT DOCUMENTS

| | | | | |
|---|---|---|---|---|
| 2,876,987 | A * | 3/1959 | Renfro ................... | F16K 41/046 251/214 |
| 3,198,211 | A * | 8/1965 | Gray, Jr. ................ | F16K 11/025 137/625.4 |
| 3,379,405 | A * | 4/1968 | Natho ..................... | E21B 34/04 251/31 |
| 3,556,472 | A * | 1/1971 | Grove ..................... | F16K 41/04 251/214 |
| 4,157,167 | A * | 6/1979 | Akkerman .............. | E21B 34/16 137/102 |
| 4,394,023 | A * | 7/1983 | Hinojosa ................. | F16K 41/02 251/214 |
| 4,585,210 | A * | 4/1986 | Adams .................... | F16K 1/10 251/214 |

(Continued)

*Primary Examiner* — John Bastianelli
(74) *Attorney, Agent, or Firm* — Jason P. Mueller; FisherBroyles, LLP

(57) ABSTRACT

A stuffing box assembly for a valve includes a stuffing box and a packing module. The packing module carries one or more seals to engage with the stuffing box and a valve stem extending through the stuffing box. The packing module is able to be installed into, and removed from, the stuffing box as a single assembly. A valve stem can be formed with an integral ball on one end for engaging with a valve seat. The seals of the packing module create a fluid-tight seal against the valve stem and the stuffing box to inhibit fluid leakage through the stuffing box.

10 Claims, 5 Drawing Sheets

(56) References Cited

U.S. PATENT DOCUMENTS

| | | | | |
|---|---|---|---|---|
| 4,630,636 A | * | 12/1986 | Cutcher | F16J 15/185 137/315.28 |
| 4,660,591 A | * | 4/1987 | Brown | F16K 5/0678 137/312 |
| 6,089,531 A | * | 7/2000 | Young | F16K 41/04 251/285 |
| 6,832,750 B2 | * | 12/2004 | Nearpass | F16K 43/008 137/625.5 |

* cited by examiner

PACKING MODULE AND STUFFING BOX ASSEMBLY

CROSS-REFERENCE TO RELATED APPLICATIONS

This application claims the benefit under 35 U.S.C. § 119(e) of U.S. Provisional Application No. 62/872,812, filed Jul. 11, 2019, the disclosure of which is incorporated, in its entirety, by this reference.

BACKGROUND

The field of the present disclosure is related to control valves, and more specifically, to maintaining a fluid tight seal of the valve stem at the stuffing box.

In many industrial applications, control valves are useful as dump valves, pressure regulation valves, fluid flow rate valves, and liquid level valves, among other uses. A control valve may cooperate with a valve seat to regulate or control fluid flow through the valve.

In some cases, the valve stem is surrounded by a stuffing box that includes components designed to inhibit leakage of fluids around the valve stem. In some cases, oil or grease is located within the stuffing box to lubricate the sealing surfaces in the stuffing box; however, intermittent pumping may cause the lubricant to settle, the lubricant may leak from within the valve or become contaminated, high friction, high heat, or some other condition may dry out or otherwise wear out the packing or other components in the stuffing box and cause failure and leakage of fluids.

In the case of a leaking stuffing box, the fluid flow must be shut down for several hours or days while the components are replaced. Moreover, leakage of fluids and/or gas may additionally harm the environment and result in fines for violating environmental impact rules.

While traditional stuffing boxes provide systems for inhibiting fluid leakage around the valve stem, it would be desirable to provide improvements that result in a more robust stuffing box, an increased service life, and simpler service. These, and other features will become apparent from the following description.

SUMMARY

A packing module is insertable into a stuffing box for a valve and includes an annular packing body having an inner surface and an outer surface. One or more inner grooves are formed in the inner surface and one or more outer grooves are formed in the outer surface. A first seal is disposed in the one or more inner grooves while a second seal is disposed in the one or more outer grooves. The inner and outer grooves are annular in shape. The packing module is insertable into the stuffing box as a single piece.

The annular packing body may have a first length and the stuffing box has a stuffing box bore defining a second length. The first length is at least 90% of the second length. That is, the annular packing body is nearly as long as, or longer than, the stuffing box bore. In some cases, the packing body extends beyond a constant diameter portion of the stuffing box bore. In some embodiments, one or more packing modules may be used within the stuffing box.

In some embodiments, the annular packing body is formed of a brass or brass alloy material. The first seal may be a T-seal and the second seal may be an O-ring. The T-seal may optionally have backup rings to assist with providing a long-lasting fluid tight seal.

A valve stem may be insertable through the annular packing body. The valve stem may include a ball seal at one end of the valve stem, and the ball seal may be configured to sealingly engage a valve seat.

According to some embodiments, a stuffing box assembly for a valve includes an annular stuffing box defining a longitudinal bore. A packing module is configured to fit within the longitudinal bore, the packing module having a packing body carrying one or more seals. The packing module can be configured to be insertable into the longitudinal bore as a single piece.

The packing module may be annular in shape having a longitudinal axis, and further having an inner surface and an outer surface. At least one of the inner and outer surfaces may define an annular groove about the longitudinal axis. The annular groove may carry a resilient seal. In some cases, the resilient seal is one or more of a T-seal, a ring seal, or an O-ring seal.

In some embodiments, one or more inner annular grooves are formed on the inner surface of the packing body and one or more outer annular grooves are formed on the outer surface of the packing body. A T-seal may be disposed within the one or more inner annular grooves and an O-ring may be disposed within the one or more outer annular grooves. The T-seal may be configured for providing a fluid-tight seal against a valve stem inserted through the stuffing box and packing module.

According to some embodiments, the longitudinal bore defines a first diameter defining a first volume and the packing module is configured to substantially fill the first volume. In some cases, the longitudinal bore defines a second diameter smaller than the first diameter and the second diameter defines a second volume providing a clearance space.

In some embodiments, a stuffing box assembly for a valve includes a stuffing box having a longitudinal axis and a bore along the longitudinal axis; a packing module configured to fit within the bore, the packing module including a packing body and one or more seals carried by the packing body to engage with the surface of the bore; and a valve stem extending through the stuffing box and packing module along the longitudinal axis, the valve stem comprising a ball valve seal on one end configured to engage with a valve seat, the valve stem being selectively positionable to adjust a gap between the ball valve seal and the valve seat to regulate flow through the valve.

In some cases, the valve stem and ball valve seal are formed as a single piece.

The packing module may include more than one packing body, and each of the packing bodies may carrying one or more seals.

In some instances, the bore has a first length having a first diameter along the first length and the packing module engages the bore along the entirety of the first length. That is, the packing module may be nearly as long as, or in some cases, longer than, the bore.

The packing module may further include inner seals carried by the packing body along an inner surface, the inner seals configured to engage with the valve stem passing through the packing body.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Figure 1:
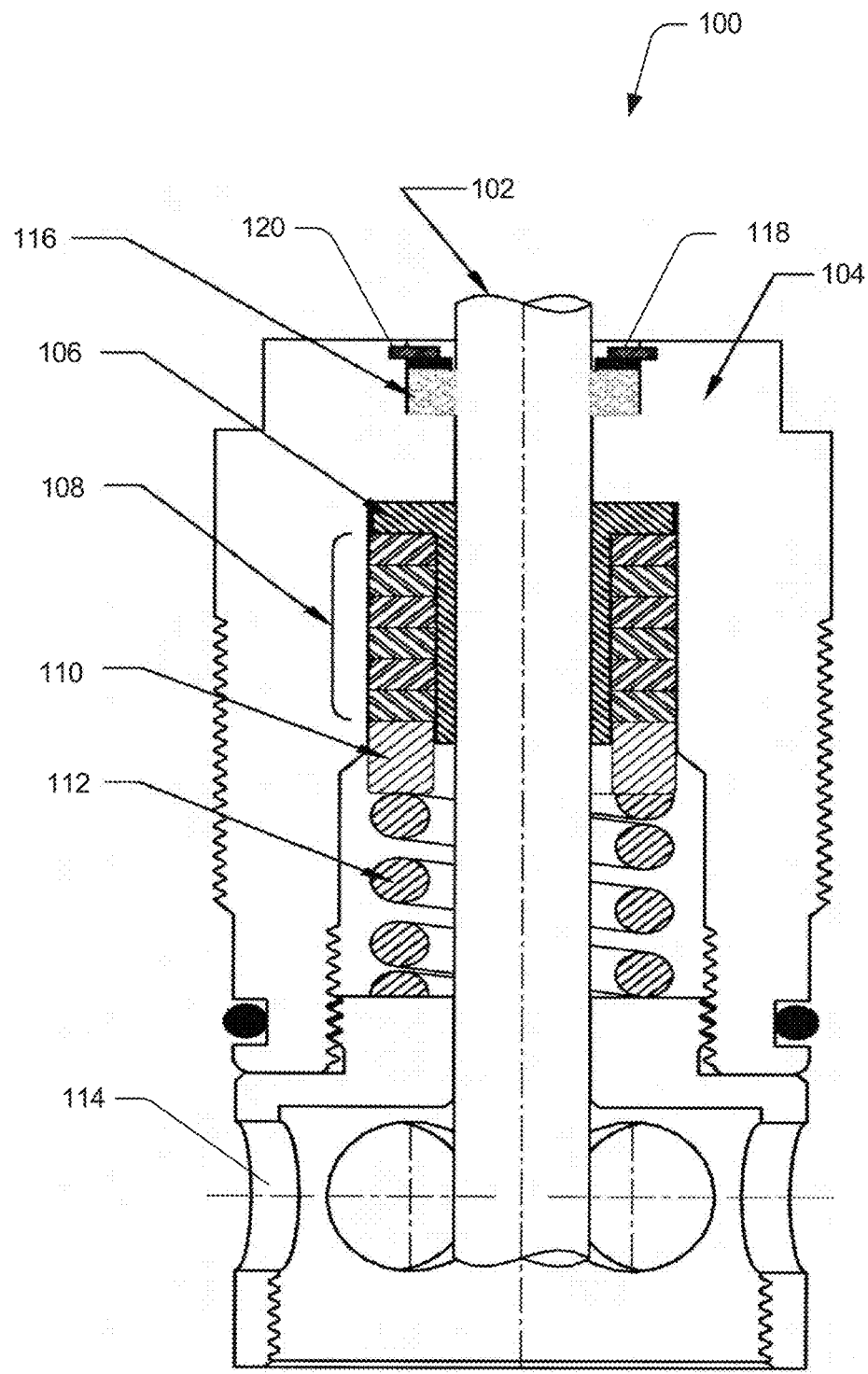
FIG. 1 shows a prior art control valve stuffing box assembly.

With reference to FIG. 1, a prior art valve stuffing box assembly 100 is illustrated having a valve stem 102 and a stuffing box 104. The stuffing box 104 is configured to be inserted into a valve body and supports a sleeve 106 having an aperture that journals the valve stem 102. The sleeve 106 may contact the stem 102 and provide for a fluid tight seal therewith. A plurality of packing rings 108 are disposed radially outwardly from the sleeve 106 and are formed of a polymer material. A follower 110 is disposed adjacent the packing rings 108 and is in contact with a spring 112 which biases the follower against the packing rings 108. A cage 114 engages with the stuffing box such as by a threaded coupling and provides a positive stop for the spring 112. As the stuffing box 104 is threaded onto the cage, the spring 112 is compressed and biases the follower to compress the packing rings 108. As the stuffing box 104 is threaded further onto the cage 114, the spring 112 exerts a greater force on the follower and consequently, the packing rings 108.

As the packing rings 108 are compressed, they have a tendency to expand radially outwardly against the stuffing box 104 and radially inwardly against the sleeve 106. The compression of the packing rings 108 is relied upon to create a fluid tight seal around the valve stem 102 and sleeve 106 to inhibit the escape of fluid or gas from the valve. An annular felt wiper 116 may be provided to provide an external debris barrier to the valve stem 102. The annular felt wiper 116 is secured by a retainer 118 which is held in place by a snap ring 120.

As discussed above, the stuffing box assembly 100 may have a tendency to wear out, and based on data from real world usage, the stuffing boxes in the prior art have been known to fail after a few hours of use in abrasive environments, for example, fracking applications. Any downtime of the piping system results in increased cost in repair parts and labor as well as lost profits due to the system being offline. Currently available stuffing box assemblies used in the fracking industry suffer from several disadvantages. For example, sediment tends to solidify around packing components which results in loss of packing compression. The valve stem is typically made of a soft metal which tends to scar quickly from fracking sand. The valve stem and ball is a two-piece design which has inherent weakness at the joint between the valve stem and ball. Solid particles are able to ingress into the packing components and build up between the seals and the stem, and migrate throughout the stuffing box assembly where internal parts engage each other, thereby leading to accelerated wear and failure. Further, the solids entering the assembly prevent the spring from engaging with the seals. Finally, the single sealing area of current designs is not adequate to protect the internal components to inhibit wear of the valve stem, ball, cage, and stuffing box, and does not promote proper alignment of the valve stem with the valve seat.

In order to repair a leaky stuffing box 104, the stuffing box 104 and cage 114 are first removed from the valve body. The cage 114 is unthreaded from the stuffing box 104 and the valve stem 102 can be removed. Next, the spring 112 can be removed and then the follower 110. Once those pieces are removed, the packing rings and sleeve 106 can be withdrawn from the stuffing box 104. New components may then be inserted in reverse order and the stuffing box 104 can be reinstalled into the valve body.

The embodiments described herein offer numerous advantages that increase the service life of the stuffing box assemblies and valves described throughout. For example, providing multiple T-seals with backup rings creates multiple sealing areas and provides protection and inhibits solids ingress to a level that is far superior to existing designs. A single piece stem/ball design provides improved strength, and forming these components out of harder materials greatly improves the service life by reducing wear. Further, the described arrangement encourages valve stem alignment with the valve seat and other components, thus reducing wear and controlling valve seat engagement. The back-up rings scrape solids and debris thus protecting the valve and the valve stem from abrasion wear from solids entering the stuffing box. Finally, the described components simplify redress of the stuffing box.

Figure 2:
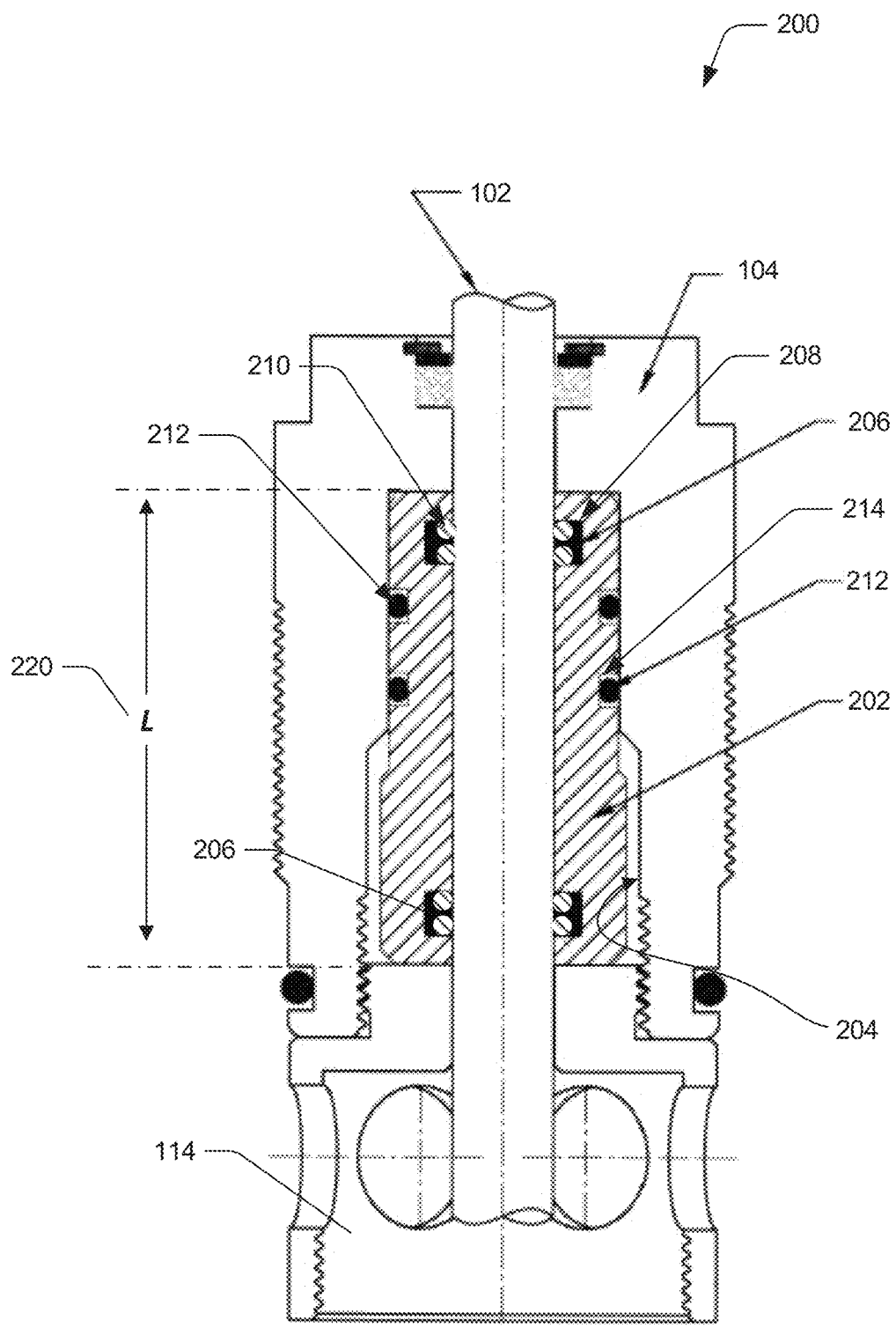
FIG. 2 shows a packing module fit into a traditional stuffing box, in accordance with some embodiments.

With reference to FIG. 2, an improved packing module 200 is illustrated that, in some embodiments, can be retrofit into the stuffing box 104 of FIG. 1. The packing module 200 includes a packing body 202 that fits within the stuffing box bore 204. On the inner diameter of the packing body 202, one or more T-seals 206 are provided in correspondingly shaped grooves 208 in the packing body 202, backup rings 210 are also provided in the grooves 208 to provide a fluid tight seal between the packing body 202 and the valve stem 102. The outer surface of the packing body may support one or more sets of O-rings 212 which may be provided in corresponding grooves 214 formed into the packing body 202 outer surface.

The stuffing box 104 may couple to the cage 114 as previously described. In some embodiments, the packing module 200, T-seals 206, backup rings 210, and O-rings 212 can be formed of any suitable material depending on the intended application for the valve. For example, in some embodiments, the packing module 200 may be formed from brass, bronze, a polymeric material, an alloy, or a combination of materials.

In some embodiments, the O-rings 212 provided on the outside of the packing body 202 provide a fluid-tight seal against the stuffing box bore 204 to inhibit fluids from migrating out of the stuffing box 104 at unintended locations. It should be appreciated that while this description describes fluid flow through the valve, the description is equally applicable to gas flow and the use of the terms "fluid" or "fluid-flow" are broad and include flowing gasses as well.

In some embodiments, the T-seals 206 are configured to provide a fluid-tight seal between the packing module 200 and the valve stem 102. The T-seals 206 provide a seal even when subjected to spiraling and extraction forces applied by the actuation of the valve stem, which may be operated by rotation and translation and may be operated by an actuator in response to a signal, a force, a pressure, or some other trigger to open, adjust, or close the valve. The packing module 200 can be packed with grease to provide a long-life and allow smooth operation of the valve stem 102.

As can be seen, the packing module 200 provides a single piece that can be removed and replaced within the stuffing box 104 very quickly and efficiently. As compared with the stuffing box in FIG. 1, which requires at least 4 components to be removed, inspected, and replaced, the improved packing module 200 shown in FIG. 2, provides for a single piece that is removed and replaced in order to rebuild the stuffing box 104. In order to rebuild the stuffing box 104 of FIG. 2, the cage 114 is decoupled from the stuffing box 104, the valve stem 102 is removed, and the packing module 200 can then be removed from the stuffing box bore 204 as a single piece.

In some embodiments, the packing module 200 has a length L 220 that is slightly longer than the length of the stuffing box bore 204 when the stuffing box 104 is fully seated on the cage 114. In some embodiments, the length L 220 is configured to be shorter than, or the same length as, the length of the stuffing box bore 204 when the stuffing box 104 is fully seated on the cage 114, and the length L 220 may be determined based upon the material selected for the packing module 200. In some embodiments, the length L 220 is at least 75%, or 80%, or 85%, or 90%, or 95%, of the length of the stuffing box bore 204. In some embodiments, the packing body 202 does not contact the stuffing box bore 204 or the valve stem 102, rather, the T-seals 206 and O-rings 212 contact these parts, respectively, to provide the fluid tight seal within the stuffing box 104.

Figure 3:
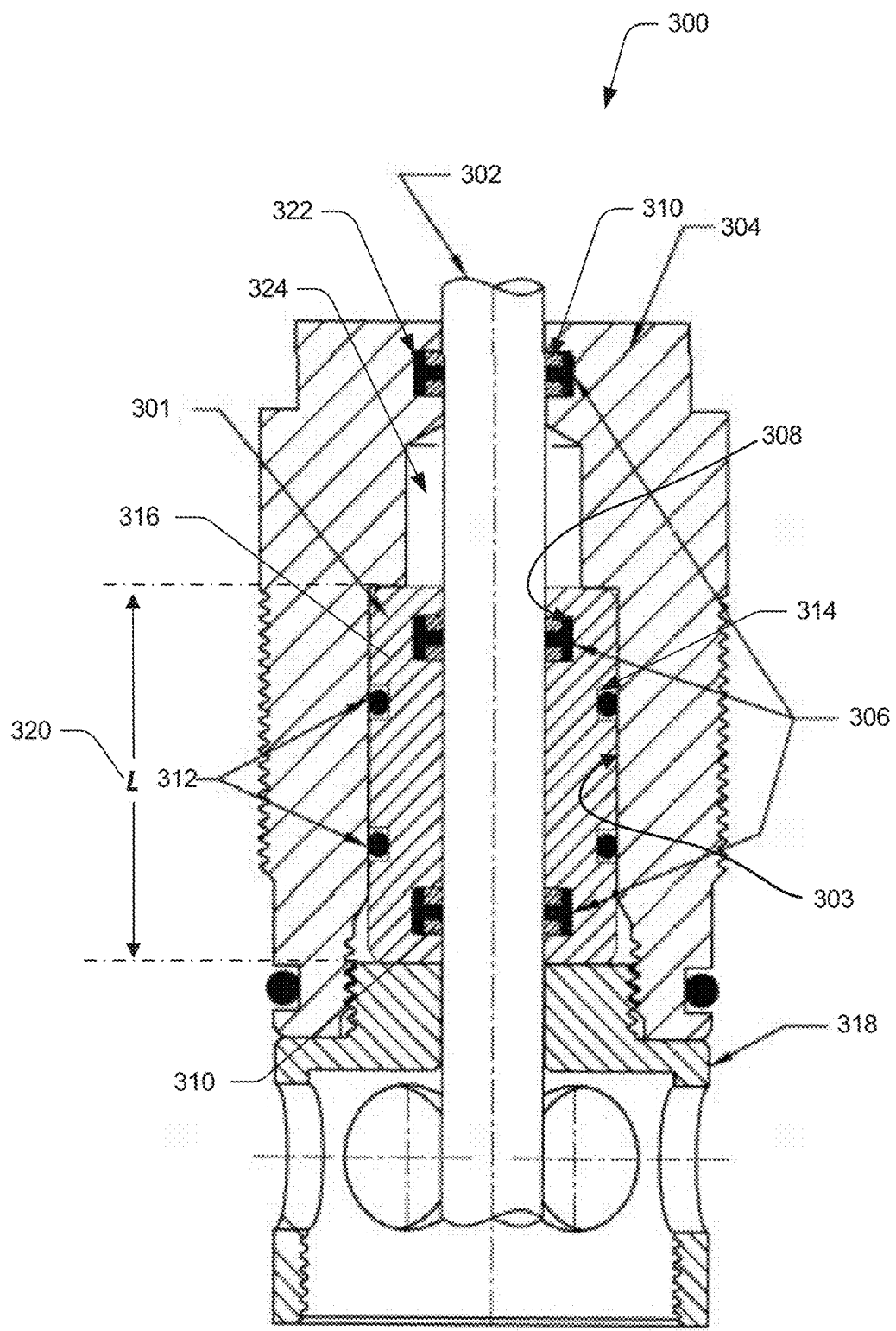
FIG. 3 shows a stuffing box and packing module with seals, in accordance with some embodiments.

FIG. 3 illustrates a stuffing box assembly 300 and packing module 301 with seals. The packing module 301 is substantially similar to the packing module 200 of FIG. 2, although may have different dimensions corresponding to the stuffing box bore 303 of the stuffing box 304. For example, the packing module 301 includes a packing body 316 having a length L 320 that may be different, or the same, as the length of the packing module 200 from FIG. 2. Likewise, the packing module 301 may be formed of the same, or different, materials, and the materials may be selected based upon the intended use of the valve assembly. In some embodiments, the packing body 316 may be formed of any of a number of brass or bronze alloys, or an alloy formed of a combination of brass and bronze. Of course, other materials are suitable and can be chosen depending on the intended use.

In some embodiments, the stuffing box 304 is formed of a any of a number of suitable steels, such any of a number of martensitic steels, and may be formed of stainless steel. In some embodiments, the stuffing box may be formed of 17-4 PH stainless steel. According to some embodiments, the stuffing box is formed of a steel having an ultimate tensile strength of about 135 kpsi to about 190 kpsi, In some embodiments, such as a low-pressure regulating valve, a softer steel may be used, which may have an ultimate tensile strength of from about 78 kpsi to about 100 kpsi. It should be appreciated that the specific type of material may be selected based upon a number of factors, such as, for example, the fluid within the valve, the expected pressure range, and the anticipated service life of the valve.

The packing body 316 may have one or more annular inner grooves 308 formed within its inner surface and one or more annular outer grooves 314 formed in the outer surface. The inner grooves 308 may be configured to carry a T-seal 306 and back-up rings 310. The outer grooves 314 may be configured to carry an O-ring 312. The T-seals 306 may be configured to seal against the valve stem 302 and the O-rings may be configured to seal against the stuffing box bore 303.

The stuffing box 304 may have one or more annular groves 322 to support one or more seals, such as a T-seal, and O-ring, or a combination to provide a seal between the stuffing box 304 and the valve stem 302. In some embodiments, a portion of the stuffing box bore 303 is configured with a diameter larger than the diameter of the valve stem 302, thus creating a gap 324 therebetween. In some cases, this gap 324 is downstream of the packing module 301 and provides a cavity for grease to be packed The cage 318 may be coupled to the stuffing box 304 through any suitable means, but in some cases, is couple by a threaded connection. The cage may be formed of any suitable materials, but in some embodiments, is formed of the same material as the stuffing box 304, which may be 17-4 stainless steel in some instances.

The embodiments illustrated in FIG. 3 may be used to replace an entire stuffing box assembly 300 from an existing valve. In some embodiments, the illustrated stuffing box assembly 300 is sized and dimensioned to replace a stuffing box assembly from an existing valve. In other words, a stuffing box assembly, such as that shown in FIG. 1, can be replaced in its entirety with the stuffing box assembly 300 shown in FIG. 3. Consequently, rather than rebuild the stuffing box assembly of FIG. 1, the entire assembly can be replaced quickly and efficiently with a new stuffing box assembly that will have a longer life, fewer parts, and improved performance.

In some cases, embodiments of the stuffing box assembly described herein have operated for over 1,000,000 cycles of the valve with no failures.

Figure 4:
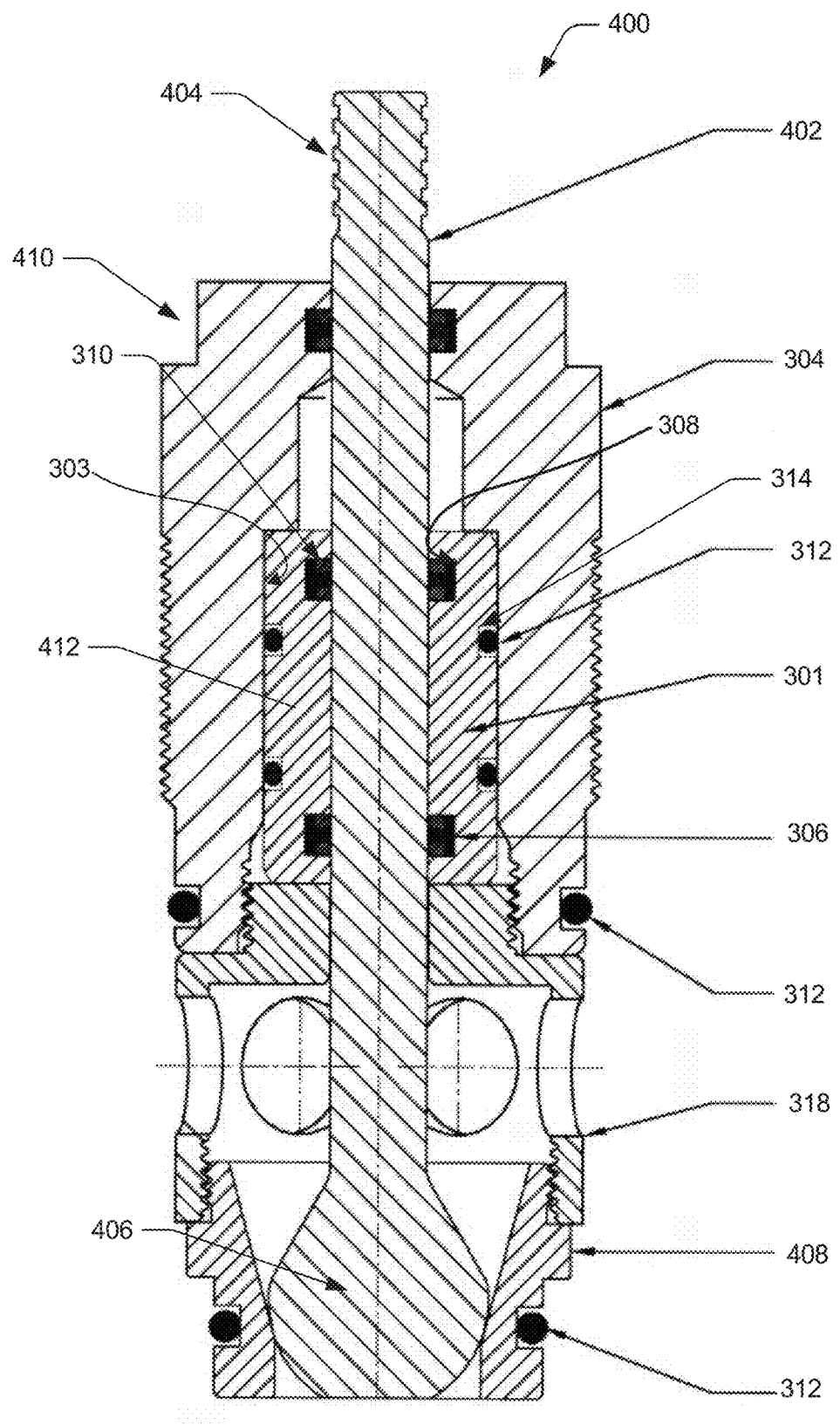
FIG. 4 shows a control valve stuffing box assembly with a one-piece stem and ball, in accordance with some embodiments.

FIG. 4 illustrates a stuffing box assembly 400 with a one-piece stem 402 and ball 406 and seat 408. According to some embodiments, a stuffing box assembly 410 may include a packing module 301 and a valve stem 402. In some cases, the packing module 301 may be substantially similar to the packing module 301 shown in FIG. 3. The packing module 301 may include a packing body 412 that carries one or more seals, such as one or more T-seals 306, and backup rings 310, and/or one or more O-rings 312.

In addition to replacing a packing module 301 assembly in an in-service valve as described herein, the entire stuffing box assembly 410 may be replaced including the valve stem 402. In some cases, the stuffing box assembly 410 includes a packing module 301 having one or more annular seals about its inner surface, and one or more seals about its outer surface. In some embodiments, the inner surface has one or more grooves 308 formed therein to carry one or more seals, such as a T-seal 306 and backup rings 310, as previously described. The outer surface may likewise have one or more outer grooves 314 configured to carry one or more seals, such as O-rings 312, to provide a fluid-tight seal against the stuffing box bore 303.

A valve stem 402 may have a first end configured with grooves or threads 404 such as for engaging with an actuator, and a second end configured with an integral valve seal 406. In some cases, the valve seal is a ball 406 and may be formed integrally with the valve stem 402 as a single piece.

The valve stem 402 and valve seal 406 may be formed of any suitable material, and in some embodiments, are formed of 17-4 PH stainless steel.

In some embodiments, the stuffing box 304 is formed of a suitable material depending on the intended application and may be formed of 17-4 PH stainless steel. Similarly, the cage 318 and valve seat 408 may also be formed of suitable materials, and in some embodiments, are formed of 17-4 PH stainless steel.

In some cases, the stuffing box assembly 410 may be provided as a retrofit part to replace a worn stuffing box assembly in an in-service valve. The size and shape of the stuffing box 304 may be configured to fit any desired valve that could benefit from replacement of the stuffing box assembly 410 components. Accordingly, there may be no need to disassemble the stuffing box assembly 410 to replace individual components, but rather, the entire stuffing box assembly 410 can be swapped out, providing for an efficient repair with minimal downtime, which may also provide an upgrade in the quality and service life of the components.

In some embodiments, the packing body 412 may be formed of a relatively soft metal, such as, for example, brass or a brass alloy. The seals may be formed of any suitable material, such as, for example, nitrile, nylatron, polyurethane, fluorosilicone, TFE/P, hydrogenated nitrile, highly saturated nitrile (HSN), or some other suitable material or combinations of materials. In some instances, one or more of the seals may have a hardness that allows the seal to elastically deform when the packing module 301 is installed in the stuffing box 304. The seals may have a hardness within the range of from about Shore 60 to about Shore 80, and in some cases, is about Shore 70A durometer. As used herein, the term "seal" is a broad term and is meant to include any device or structure that inhibits fluid flow. Examples of seals used herein include T-seals, O-rings, backup rings, gaskets, washers, and the like.

Figure 5:
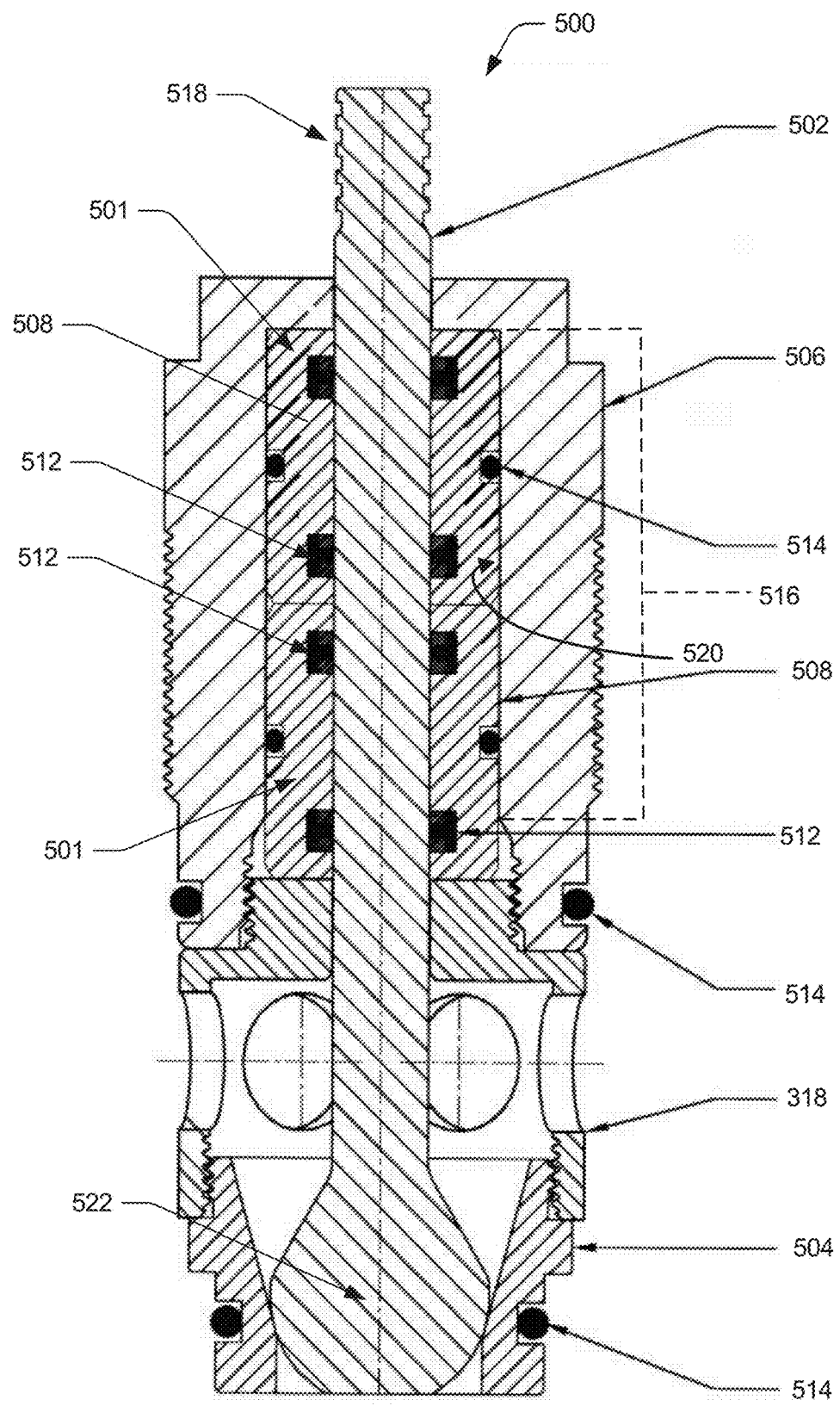
FIG. 5 shows a control valve stuffing box assembly with multiple packing modules with a stem and seat, in according with some embodiments.

FIG. 5 illustrates a, stuffing box assembly 500 with stem 502 and seat 504. The stuffing box assembly 500 includes a stuffing box 506 and one or more packing modules 501 within the stuffing box 506. The packing module 501 includes a packing body 508 that carries one or more seals. In the illustrated example, two packing modules 501, such as two packing bodies 508 each carrying two T-seals 512 in a groove formed on the inner surface of the packing bodies 508, and one or more O-rings 514 disposed in a corresponding groove formed on the outer surface of the packing bodies 508 may be used. In some embodiments, this may be considered as having one or more packing modules 501 within the stuffing box, and provides additional seals to restrict debris from entering the packing module and further provides support to align and guide the valve stem 502.

The stuffing box bore 520 can be sized and shaped to accommodate the one or more packing bodies 508. The packing bodies 508 in any of the embodiments described herein may be formed of suitable materials, and in some cases, are formed of free-cutting brass, such as C36000 brass which may be tempered to a H02 (half hard) temper.

In the illustrated example, the stuffing box bore 520 includes a threaded section configured to engage with corresponding threads of the cage 318 and a constant diameter section 516. As compared with FIG. 4, the constant diameter section 516 provides an increased volume within which to house the one or more packing bodies 508, thereby providing a longer support for the stem 502 and optionally, additional seals 512 to inhibit fluid leakage. Additional O-rings 514 may optimally be provided on the outside surface of the stuffing box 506, on the cage 318, on the valve seat 504, or a combination of locations.

The stem 502 may have a first threaded end 518 configured to couple to an actuator, such as a handle, motorized actuator, hydraulic actuator, or some other type of actuator. The stem 502 has a second end configured with a seal 522, such as a ball, suitable for mating with a valve seat 504 to restrict or inhibit fluid flow through the valve. The seal 522 may formed integrally with the stem 502.

In some embodiments described herein, the valve and concomitant components are configured to operate under high-pressure conditions. As used herein, "high-pressure" refers to pressures up to 4000 psi.

According to some embodiments, a packing module is provided as a single unit that can be used to replace similar components to repair a leaky valve. The packing module includes a packing body and one or more seals. According to some embodiments, a stuffing box assembly is provided to replace similar components to repair a leaky valve in-service. The stuffing box assembly includes a stuffing box and a packing module, and in some cases a valve stem and valve seat.

The valves described herein can be useful in many industrial applications, and may find particular relevance and use within the oil and gas industry. In use, the valve stem 502 is actuatable, such as by rotation or translation, which causes translation of the ball 522 which is moved into contact with, or away from, the valve seat 504. When pressurized fluid is upstream of the ball seal 522, once the ball seal moves away from the valve seat 504, fluid can flow past the ball seal 522 and into the valve body where it can be directed to any piping coupled to the valve body as desired. The valve stem 502 can be manipulated to move the ball seal 522 toward the valve seat 504 which causes a decrease in fluid flow until the ball seal 522 completely contacts the valve seat 504 thus shutting off fluid flow through the valve. The valve stem 502 can be actuated by any suitable actuator, and may be actuated manually, automatically, such as in response to a pressure, under control of one or more computer processors, or through some other mechanism or trigger.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

As used herein, the term "or" is used inclusively to refer items in the alternative and in combination. As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof

What is claimed is:

1. A stuffing box assembly for a valve having a valve stem, comprising:
    an annular stuffing box having a longitudinal axis, the annular stuffing box including:
    an open end annularly spaced from the valve stem;
    a closed end through which the valve stem passes, the closed end surrounding and contacting the valve stem;
    a longitudinal bore extending along the longitudinal axis from the open end toward the closed end, a first portion of the longitudinal bore having a first diameter; and
    a valve stem aperture extending through the closed end of the annular stuffing box along the longitudinal axis, the valve stem aperture having a valve stem aperture diameter that is smaller than the first diameter;
    an annular groove extending about an inside surface of the valve stem aperture; and
    a valve stem seal disposed in the annular groove sealing the valve stem;
    an annular packing module having an inner surface and an outer surface and a length configured to fit within the first portion of the longitudinal bore, the packing module having a packing body, the packing body including:
    at least one inner annular groove about the longitudinal axis formed in the inner surface;
    at least one outer annular groove about the longitudinal axis formed in the outer surface;
    at least one inner seal disposed in the inner annular groove sealing the valve stem; and
    at least one outer seal disposed in the outer annular groove sealing the longitudinal bore of the annular stuffing box; and
    wherein the packing module is configured to be insertable into the first portion of the longitudinal bore through the open end of the annular stuffing box as a single piece.

2. The stuffing box assembly as in claim 1, wherein at least one of the inner seal and the outer seal is a resilient seal.

3. The stuffing box assembly as in claim 2, wherein the resilient seal is one or more of a T-seal, a ring seal, or an O-ring seal.

4. The stuffing box assembly as in claim 1, further comprising two or more inner annular grooves on the inner surface, and two or more outer annular grooves on the outer surface.

5. The stuffing box assembly as in claim 4, further comprising T-seals disposed within the inner annular grooves and an O-ring disposed within the outer annular grooves, the T-seal providing a fluid-tight seal against a valve stem inserted.

6. The stuffing box assembly as in claim 1, wherein the first portion of the longitudinal bore defines a first volume, the packing module configured to substantially fill the first volume.

7. The stuffing box assembly as in claim 1, wherein the longitudinal bore further comprises:
    a second portion having a second diameter that is smaller than the first diameter and larger than the valve stem aperture diameter, wherein the second portion of the longitudinal bore is disposed between the first portion of the longitudinal bore and the closed end of the annular stuffing box.

8. The stuffing box assembly as in claim 1, wherein the open end of the annular stuffing box further includes:
    threads extending about an inside periphery of the longitudinal bore.

9. The stuffing box assembly as in claim 8, wherein the threads extend from open end into the first portion of the longitudinal bore.

10. The stuffing box assembly as in claim 1, wherein the annular packing body has a first length and the first portion of the longitudinal bore defines a second length, wherein the first length is at least 90% of the second length.

* * * * *